3,036,087
PROCESS FOR THE PREPARATION OF PHOSPHO-
CREATINE AND/OR PHOSPHOCREATININE
Jesus Anatol, Paris, France, assignor to Compagnie
Francaise des Matieres Colorantes, Paris, France, a
company of France
No Drawing. Filed Sept. 24, 1959, Ser. No. 841,955
Claims priority, application France Sept. 26, 1958
8 Claims. (Cl. 260—309.7)

The present invention relates to a process for the synthesis of phosphocreatine which enables this substance to be prepared industrially, for example, in the form of its sodium salt, or the disodium salt of its cyclised form, i.e. as phosphocreatinine.

Phosphocreatine has been isolated from muscle by C. H. Fiske and Subarrow (Journal of Biological Chemistry, 1929, 81, 620). These authors have also established its constitution, which corresponds to the formula:

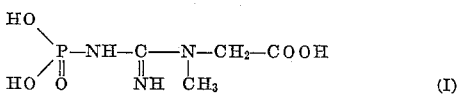
(I)

The part which this substance plays in muscular contraction as the donor of the phosphate ion is well known, hence the name "phosphagen" by which it is sometimes called.

Until 1938, phosphocreatine was isolated from muscle in the form of alkaline earth salts. It was at this date that K. Zeile and G. Fawaz (Hoppe Seyler's Zeitschrift für Physiologische Chemie, 1938, 256, 194) succeeded in obtaining small amounts of calcium phosphocreatinate, by phosphorylating creatine in a very strongly basic medium with phosphorus oxychloride.

A. H. Ennor and L. A. Stocken (Biochemical Journal, 1948, 43, 190) have made use of the phosphorylation technique of Zeile, followed by a variation of the isolation process of Fiske, and have also obtained small amounts of tetra- or hexa-hydrated sodium phosphocreatinate. This process is almost the same as the process of Ennor and Stocken which is described in Biochemical Preparations V, 1957, p. 9. This process is long and the separations are laborius. All other attempts at the synthesis of phosphocreatine have been fruitless.

The present invention has as its object a process for the preparation of phosphocreatine and/or phosphocreatinine by a new method which enables manufacture on an industrial scale to be carried out.

It is known that the O-substituted derivatives of isoureas, the S-substituted derivatives of isothioureas or the substituted cyanamides are capable of reacting with amines to form guanidines. For example, F. Cramer and A. Vollman (Chemische Berichte, 1958, 91, 920) have condensed diesters of phosphorylisothioureides with amino derivatives and have foreseen the possibility of condensing with α-amino-acids or esters of α-amino-acids. It has been effectively verified by the applicant that such a condensation enabled triesters of phosphorylated guanidines substituted by a chain containing a COOH group to be obtained. By this process one can lead to tri-esters of phosphocreatine.

The present invention consists essentially in subjecting these tri-esters of phosphocreatine to hydrolysis under controlled conditions so that only the carboxylic ester group is hydrolysed, and then submitting the product isolated to hydrogenolysis causing cleavage of the phosphoric ester groups without scission of the

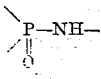
linkage.

To obtain good results, the starting diesters of the phosphorylisothioureides must be chosen so that this cleavage without scission of the

linkage is possible; such diesters are the diesters of benzyl alcohol which may be substituted on the benzyl nucleus.

In this way, among other esters, the N-dibenzyl-oxyphosphorylated derivative of S-methyl isothiourea was first prepared:

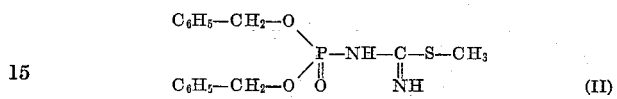
(II)

by the action of dibenzyl phosphite in solution in carbon tetrachloride (A. R. Todd, et al., Journal of Chemical Society, 1945, 662) on S-methyl isothiouronium sulphate in the presence of caustic soda.

This N-dibenzyl-oxy-phosphoryl-S-methyl isothiourea has been subjected to the action of mercuric oxide (HgO), with the object of preparing the corresponding cyanamide, taking into account the work of H. J. Backer and H. P. Moed (Recueil des Travaux Chimiques des Pays-Bas, 1947, 66, 335) and of H. J. Backer and S. K. Wodman (Recueil des Travaux Chimiques des Pays-Bas, 1948, 68, 595); these authors have observed, in fact, the poor stability of p-nitro-phenyl-sulphonyl-cyanamide. They have, on the other hand, called attention to the possibility of working with its sodium salt; this is why it is useful to add, in a desulphurising medium, sodium carbonate so as to form, as it is produced, the sodium derivative of dibenzyl-oxy-phosphoryl-cyanamide.

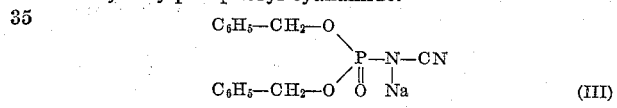
(III)

This salt reacts in alcoholic medium with the hydrochloride of ethyl sarcosinate; dibenzyl-oxy-phosphoryl ethyl creatinate is formed according to the scheme:

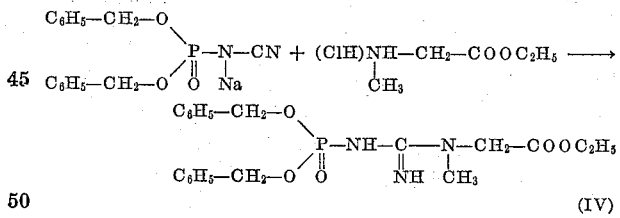
(IV)

The contact of this triester in aqueous-alcoholic medium with dilute caustic soda e.g. 10 N caustic soda in the cold hydrolyses the ester function of the carboxylic group, but any other condition of hydrolysis ending in the same result may be used according to the present invention. The sodium salt of dibenzyl-oxy-phosphoryl-creatine thus obtained can be subjected to hydrogenolysis, for example at ordinary temperature and pressure in the presence of palladium black and of a second equivalent of caustic soda; the disodium salt of phosphocreatine is obtained in excellent yield:

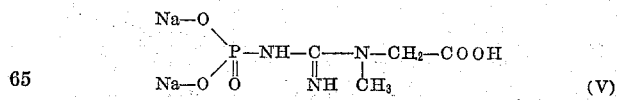
(V)

The absorption of hydrogen is rapid.

A very pure phosphocreatine in the form of the disodium salt, free from mineral phosphates and free creatine, is thus obtained. The product crystallises with 4 molecules of water of crystallisation. It is stable, non-hygroscopic and can be kept very well in stoppered bottles without special precautions.

On the other hand, the sodium salt of the diester is converted by the action of very weak acids such as acetic acid into dibenzyl-oxy-phosphoryl-creatine according to the reaction:

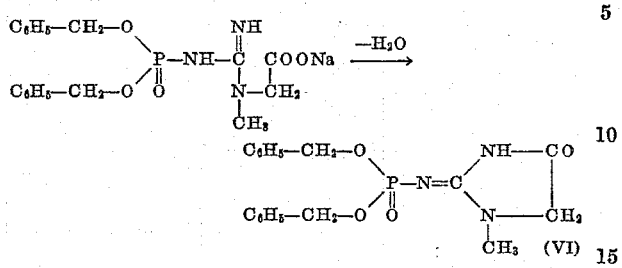

The constitution of this derivative has been proved by percentage analysis and also by comparison with the results obtained from diphenoxy-phosphoryl-ethyl-creatinate. The triester of Formula IV treated in an analogous way (treatment with caustic soda and acidification) gives rise to diphenoxy-phosphoryl-creatinine:

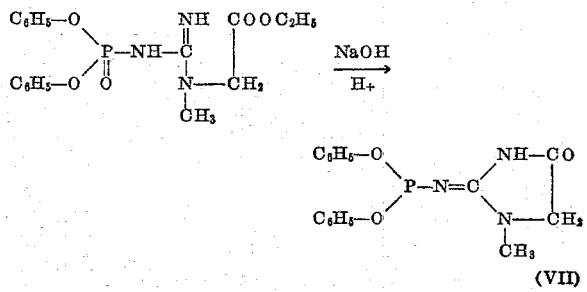

This substance has been described by H. R. Ing (Journal of the Chemical Society, 1932, p. 2054) and by K. Zeile and H. Meyer (Hoppe Seyler's Zeitschrift für Physiologische Chemie 1938, 252, 101), who obtained it by processes quite different from that of the invention.

This cyclisation is remarkable and unexpected. K. Zeile and H. Meyer (Hoppe Seyler's Zeitschrift für Physiologische Chemie, 1938, 256, 131) have stated in fact that although it is easy to pass from phosphocreatinine to phosphocreatine by opening the ring, it is impossible to convert phosphocreatine into phosphocreatinine by cyclisation. It has now been shown that this cyclisation is possible when the acid functions of the phosphoric group of phosphocreatine are esterified.

The hydrogenolysis of dibenzyloxy-phosphoryl-creatinine then leads with ease, in the presence of caustic soda, to the disodium salt of phosphocreatinine:

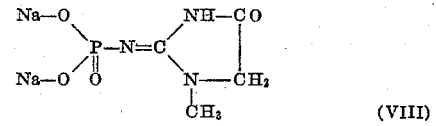

Owing to the process according to the invention, this compound which Zeile and his co-workers have only obtained by a complex method and in very small quantities, can be prepared industrially.

Phosphocreatinine can thus be obtained very pure, for example, as the crystalline sodium salt with five molecules of water. The opening of the phosphocreatinine to give phosphocreatine can be effected by the process of Zeile with decinormal caustic soda or in a more concentrated medium. The phosphocreatine prepared by this process is identical with the natural phosphocreatine extracted from muscle; this fact has been confirmed by comparison of the applicants neutralisation curves with those described by H. Fiske and Subbarow (Biochemical Chemistry, 1929, 81, 629), O. Meyerhof and K. Lohman (Biochemische Zeitschrift, 1928, 196, 66) and K. Zeile and H. Meyer (Hoppe Seyler's Zeitschrift für Physiologische Chemie, 1938, 256, 135).

To sum up, the scheme of the syntheses of phosphocreatine and phosphocreatinine of the present process is as follows:

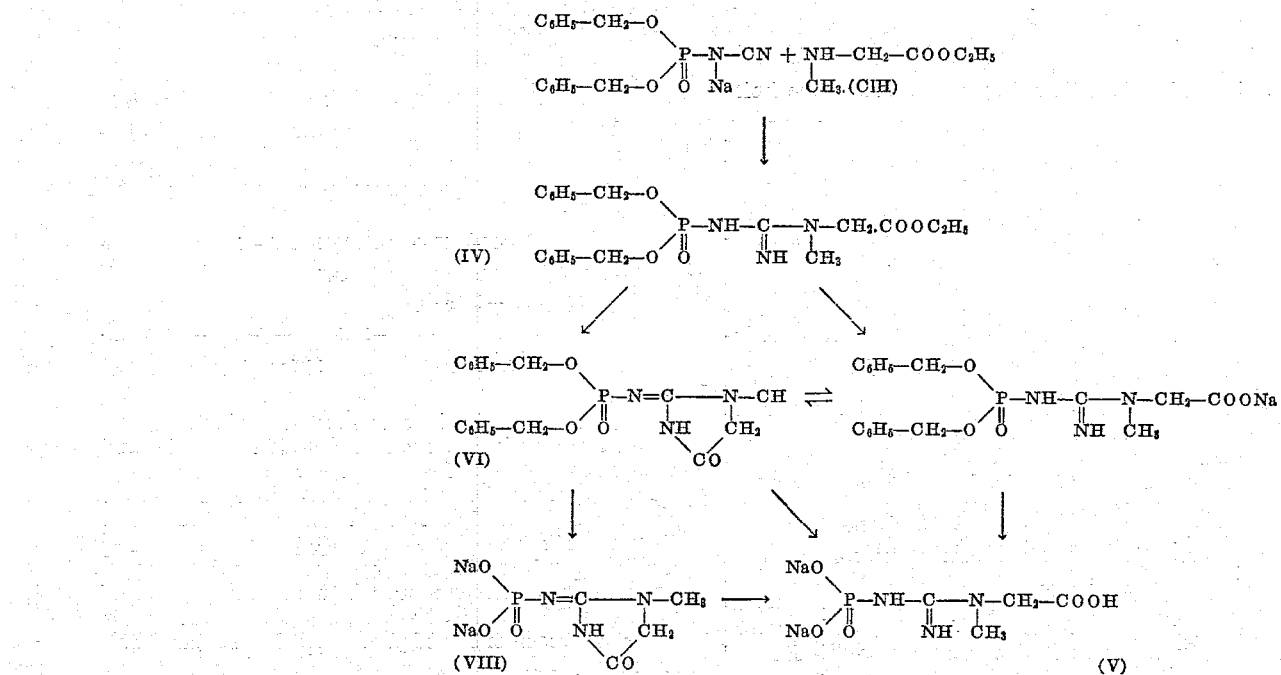

The invention will be more clearly understood by reference to the following example which is purely illustrative and in which the parts are parts by weight unless the contrary is indicated.

EXAMPLE (1) *Preparation of N-Dibenzyloxy-Phosphoryl S-Methyl Isothiourea (II)*

99 parts of S-methyl isothiourea sulphate prepared as described in Organic Syntheses, vol. XII, p. 52, are dissolved in 294 parts of water in an apparatus provided with a mechanical stirrer, a thermometer and a gauger. 186 parts of dibenzyl phosphite (preparation according to Todd, Journal of Chemical Society, 1945, p. 384, and 1946, p. 662) dissolved in 750 parts by volume of carbon tetrachloride are added. 56.8 parts of caustic soda dissolved in 170 parts of water are added through the gauger, with good agitation, the temperature being maintained at between 5° C. and 10° C. by means of a cooling bath. The introduction of the caustic soda lasts about an hour. The mixture is left under agitation for a further hour, then allowed to stand until the following day. 300 parts by volume of chloroform are then added to dissolve the solid, and the mixture is left to settle. The organic phase is dried over sodium sulphate, and is filtered and evaporated to dryness under reduced pressure. The product solidifies en masse, and is filtered with the use of petrol ether. 225 parts of N-dibenzyloxy-phosphoryl S-methyl isothiourea are thus obtained, that is a yield of 90%. The product melts in a capillary tube at 85° C. It can be recrystallised from mixtures of ethanol-water or benzene-petrol ether; the melting point is then 86° C.

Analysis for $C_{16}H_{19}N_2O_3PS$.—Calculated percent: N, 7.99; P, 8.84; S, 9.14. Found percent: N, 7.65; P, 8.75; S, 9.27.

*(II) Preparation of Dibenzyloxyphosphoryl Creatinine*

175 parts of dibenzyloxyphosphoryl S-methylisothiourea, 3000 parts of 80% ethyl alcohol, 26.5 parts of sodium carbonate and 54 parts of red oxide of mercury are introduced into an apparatus provided with a stirrer and a condenser, and are heated at boiling with agitation for two hours. After cooling, the mercury mercaptide is filtered off and the solvent is removed under reduced pressure. The residue is taken up in 1000 parts of absolute ethyl alcohol, and 76.75 parts of the hydrochloride of the ethyl ester of sarcosine of melting point 121–122° C. dissolved in 200 parts of ethyl alcohol are added to this solution. The reaction mixture is allowed to stand overnight, then is refluxed for two hours. After cooling and filtering off the sodium chloride, the alcohol present in the filtrate is removed. The residue is dissolved in 250 parts of ethyl alcohol and 60 parts by volume of 10 N caustic soda are added thereto, and left in contact for an hour. 250 parts of water are then added and the mixture is filtered and the solution acidified with 36 parts of acetic acid. It is left overnight to crystallise, filtered and the precipitate is washed with 50% ethyl alcohol, then with water and finally with 50% ethyl alcohol, and dried in the oven at 50° C. 132 parts of dibenzyloxyphosphoryl-creatinine of melting point 91–92° C. are thus obtained, i.e. a yield of 71%.

This dibenzyloxyphosphoryl-creatinine is very suitable without another purification for the preparation of phospho-creatinine and phosphocreatine.

For analysis, it is recrystallised from 70% methanol. The yield after recrystallisation is 90%. The melting point then rises to 93° C.

Analysis for $C_{18}H_{20}N_3O_4P$.—Calculated percent: C, 57.90; H, 5.40; N, 11.25; P, 8.30. Found percent: C, 57.68; H, 5.96; N, 10.89; P, 8.54.

*(III) Phosphocreatinine and Its Direct Conversion Into the Disodium Salt of Phosphocreatine*

186.5 parts of the above dibenzyloxyphosphorylcreatinine are dissolved in a mixture of 500 parts by volume of 2 N caustic soda and 150 parts by volume of ethyl alcohol. To this solution is added palladium black (prepared by hydrogenation of a mixture of 93 parts of carbon black, 1000 parts of water and 9.3 parts of palladium chloride) and hydrogenation is effected at ordinary temperature and pressure. 20,500 parts by volume of hydrogen are absorbed in two hours. The catalyst is separated by filtration, and is washed with 250+100+100 parts of water. 47.4 parts of caustic soda dissolved in 85 parts of water are added to the filtrate, and the solution is heated for 10 minutes at 80° C. It is then cooled to about 10° C. and adjusted to pH 7.8 in the presence of phenolphthalein with 1,182 parts by volume of normal hydrochloric acid. It is then filtered and 9,480 parts of ethyl alcohol are added to this solution. The disodium salt of phosphocreatine separates as an oil. It is left to crystallise for 2 to 3 days at room temperature. The crystals are filtered off, washed with 80% ethyl alcohol, then with absolute ethyl alcohol and with ether, and dried in vacuo at ordinary temperature over $P_2O_5$ and under a pressure of about 20 mms. of mercury. 163 parts of the hexahydrated disodium salt of phosphocreatine are thus obtained, i.e. a yield of 90%.

This phosphocreatine shows a titration curve identical with that described in the literature.

Analysis for $C_4H_8N_3O_5PNa_2.6H_2O$. Mol. wt. 363. Calculated percent: P, 8.54; Na, 12.67. Found percent: P, 8.54, 8.77; Na, 12.66, 12.92.

In order to recrystallise it, the phosphocreatine is dissolved in 7 parts of cold water and, after filtration, 21 parts of ethyl alcohol are added and the procedure is as before. The yield from the recrystallisation is 85%.

Analysis for $C_4H_8N_3O_5PNa_2.6H_2O$. Mol. wt. 363. Calculated percent: C, 13.22; H, 5.51; N, 11.57; P, 8.54; Na, 12.67; $H_2O$ 29.75. Found percent: C, 13.94; H, 5.40; N, 11.95; P, 8.58; Na, 12.74; $H_2O$, 28.91.

This hexahydrate of the disodium salt of phosphocreatine has been dried under a vacuum of $3\mu$ and at 60° C. until of constant weight, and then allowed to rehydrate in the open air until a constant weight. The product then contains 4 molecules of water of crystallisation.

Analysis for $C_4H_8N_3O_5PNa_2.4H_2O$. Mol. wt. 327. Calculated percent: C, 14.68; H, 4.89; N, 12.84; P, 9.48; Na, 14.07. Found percent: C, 14.66, 14.45; H, 5.78, 5.68; N, 12.73, 12.40; P, 9.17; Na, 13.61.

The tetrahydrate is also sometimes obtained directly.

The titration curve is identical with preceding curves. These data are in perfect agreement with those of A. H. Ennor and L. H. Stocken (Biochem. J., 1948, 43, 190) and of Peanasky et al. (Biochemical Preparations V, 1957, p. 9), who have prepared small quantities of the disodium salt of phosphocreatine by a different process.

*(IV) Disodium Salt of Phosphocreatinine*

160 parts of dibenzyloxyphosphoryl-creatinine are hydrogenated as in III. The catalyst is separated by filtration and washed 3 times with 125 parts of water each time. 3,620 parts of ethyl alcohol are added to the filtrate.

The disodium salt of phosphocreatinine begins to crystallise very rapidly, then solidifies completely. It is left for a day, filtered off, washed with 80% ethyl alcohol, then with ethyl alcohol and finally with diethyl ether. It is dried over $P_2O_5$ under vacuum at ordinary temperature. 117 parts of pentahydrated disodium salt of phosphocreatinine are thus obtained, i.e. a yield of 83%.

Analysis for $C_4H_6N_3O_4PNa_2.5H_2O$. Mol. wt. 327. Calculated percent: C, 14.68; H, 4.89; N, 12.84; P, 9.48; Na, 14.07. Found percent: C, 14.90; H, 5.39; N, 12.58; P, 9.48, 9.43; Na, 14.04, 14.00.

The titration curve is identical with that described by K Zeile (Hoppe Seyler's Zeitschrift für Physiologische Chemie, 1936, 236, 263), then by Zeile and Meyer (ibid., 1938, 252, 101), who have obtained small quantities of this phosphocreatinine.

In order to recrystallise this material it is dissolved in the cold in 2 parts of water and, after filtration, 8 parts of ethyl alcohol are added and the procedure is as before. The yield from the recrystallisation is 83%.

Analysis for $C_4H_6N_3O_4PNa_2.5H_2O$. Mol. wt. 327. Calculated percent: C, 14.68; H, 4.89; N, 12.84; P, 9.48;

Na, 14.07; H₂O, 27.52. Found percent: C, 14.96; H, 5.39; N, 12.58; P, 9.47; Na, 14.04; H₂O, 27.64.

The product has been dried under a vacuum of 3µ at 60° C. up to constant weight in order to determine the water. It has been rehydrated in the air and at room temperature. The disodium salt of phosphocreatinine then absorbs 2.5 mols of water.

Analysis for $C_6H_6N_3O_4PNa_2 \cdot 2.5H_2O$. Mol. wt. 282. Calculated percent: C, 17.02; H, 3.90; N, 14.89. Found percent: C, 16.96, 16.91; H, 4.19, 4.17; N, 14.89, 14.50.

I claim:

1. As a new product the dibenzyl-oxy-phosphoryl creatinine of the following formula:

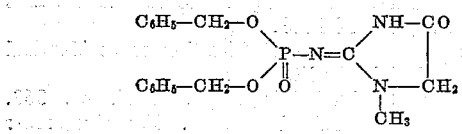

2. Process for the preparation of dibenzyl-oxy-phosphoryl creatinine which comprising hydrolysing an alkyl ester of dibenzyl-oxy-phosphoryl creatine with a caustic alkali, in aqueous alcoholic medium, adding a weak acid to the solution thus obtained until the pH is below 7 and filtering.

3. Process as claimed in claim 2 in which the alkyl ester of dibenzyl-oxy-phosphoryl creatine is the ethyl ester.

4. Process as claimed in claim 2 in which the acid added is acetic acid.

5. Process for the preparation of phosphocreatinine which comprises hydrolysing an alkyl ester of dibenzyl-oxy-phosphoryl creatine with a caustic alkali, in aqueous alcoholic medium, adding a weak acid to the solution thus obtained until the pH is below 7, filtering and reacting the product thus obtained, in aqueous medium, with hydrogen in the presence of palladium black as a hydrogenation catalyst and of a caustic alkali at a temperature below 30° C.

6. Process for the preparation of phosphocreatine which comprises hydrolysing an alkyl ester of dibenzyl-oxy-phosphoryl creatine with a caustic alkali, in aqueous alcoholic medium, adding a weak acid to the solution thus obtained until the pH is below 7, filtering, reacting the product thus obtained, in aqueous alcoholic medium, first with hydrogen in the presence of palladium black as a hydrogenation catalyst and of a caustic alkali and then with a caustic alkali at a temperature above 30° C.

7. Process as claimed in claim 6 in which the alkali is decinormal caustic soda.

8. Process for the preparation of phosphocreatine which comprises hydrolysing an alkyl ester of dibenzyl-oxy-phosphoryl creatine with a caustic alkali, in aqueous alcoholic medium, adding a weak acid to the solution thus obtained until the pH is below 7, filtering, reacting the product thus obtained, in a aqueous alcoholic medium, with hydrogen in the presence of palladium black as a hydrogenation catalyst and of a caustic alkali at a temperature above 30° C.

References Cited in the file of this patent

Greenberg: Amino Acids and Proteins (1951), pages 819, 820.